United States Patent
Kim et al.

(10) Patent No.: US 9,430,604 B2
(45) Date of Patent: Aug. 30, 2016

(54) INTEGRATED CIRCUIT PACKAGE AND METHOD

(71) Applicant: NXP B.V., Eindhoven (NL)

(72) Inventors: Jong Kim, Tempe, AZ (US); James Spehar, Chandler, AZ (US); Xu Zhang, Chandler, AZ (US)

(73) Assignee: NXP B.V., Eindhoven (NL)

( * ) Notice: Subject to any disclaimer, the term of this patent is extended or adjusted under 35 U.S.C. 154(b) by 29 days.

(21) Appl. No.: 14/250,168

(22) Filed: Apr. 10, 2014

(65) Prior Publication Data

US 2015/0169817 A1 Jun. 18, 2015

Related U.S. Application Data

(60) Provisional application No. 61/917,815, filed on Dec. 18, 2013.

(51) Int. Cl.
*G06F 17/50* (2006.01)
*H01L 23/64* (2006.01)
*H01L 25/065* (2006.01)

(52) U.S. Cl.
CPC ....... *G06F 17/5072* (2013.01); *G06F 17/5036* (2013.01); *G06F 17/5077* (2013.01); *G06F 2217/40* (2013.01); *H01L 23/64* (2013.01); *H01L 25/0655* (2013.01); *H01L 2924/0002* (2013.01)

(58) Field of Classification Search
USPC ........................................................ 716/122
See application file for complete search history.

(56) References Cited

U.S. PATENT DOCUMENTS

| | | | |
|---|---|---|---|
| 6,593,794 B2 * | 7/2003 | Yue | H01L 23/60 327/309 |
| 8,259,755 B2 | 9/2012 | Pontius | |
| 2002/0184552 A1 | 12/2002 | Evoy et al. | |
| 2007/0300196 A1 * | 12/2007 | Ishibashi | G06F 17/5031 716/113 |
| 2013/0268909 A1 | 10/2013 | Spehar et al. | |
| 2014/0036471 A1 * | 2/2014 | Yuen | H05K 7/02 361/813 |

OTHER PUBLICATIONS

CBTU04082 Product Data Sheet; 1.8 V, wide bandwidth, 4 differential channel, 2 : 1 multiplexer/demultiplexer switch with single enable; Rev. 2; Jul. 13, 2010.
CBTW28DD14 Product Data Sheet; 14-bit bus switch/multiplexer for DDR2/DDR3/DDR4 applications; Rev. 4; Aug. 12, 2013.

* cited by examiner

*Primary Examiner* — Bryce Aisaka

(57) ABSTRACT

Various example embodiments are directed to methods and apparatuses for implementing a circuit design within an integrated circuit (IC) package. A respective capacitance is determined for each die contact of a circuit design. A respective target inductance range is selected for each of the plurality of die contacts based on the determined capacitance. A segmentation of the circuit design is determined as a function of the target inductance ranges. The segmentation defines an implementation of the circuit design on a plurality of IC dies. The IC dies are placed at respective locations on the substrate, based on the resulting inductances of connections (e.g., conductive traces) between the die contacts and terminals of the IC package.

18 Claims, 3 Drawing Sheets

$Freq\_resp = f(C_{pad}, L_{bondwire})$

INTEGRATED CIRCUIT PACKAGE AND METHOD

This patent document claims benefit under 35 U.S.C. §119 to U.S. Provisional Patent Application Ser. No. 61/917,815, entitled "Semiconductor Material and Packaging Modification for Improvement of High Speed Signaling and Skew between Channels" and filed on Dec. 18, 2013, which is fully incorporated herein by reference Various aspects of the present disclosure relate to integrated circuits (ICs) and more particularly to packaging of ICs. An IC die is generally mounted in a package having external conducting terminals for connection to, for example, a printed circuit board (PCB) or other external circuit. The terminals are connected to respective contacts of the IC die (e.g., by bondwires) and operate as external contacts for the IC die.

Various example embodiments are directed to IC packages and methods for their manufacture and/or configuration. A method is disclosed for implementing a circuit design within an IC package. The package has a substrate and terminals for carrying signals communicated by the circuits of the circuit design. A respective capacitance is determined for each die contact of a circuit design. A respective target inductance range is selected for each of the die contacts based on the determined capacitance of the die contact. A segmentation of the circuit design is determined as a function of the target inductance ranges. The segmentation defines an implementation of the circuit design on a plurality of IC dies. The IC dies are placed at respective locations on the substrate, based on the resulting inductances of connections (e.g., conductive traces) between the die contacts and terminals of the IC package. More specifically, the IC dies are placed at locations at which the inductance of each connection is within the target inductance range of the corresponding die contact.

A second method is also disclosed for implementing a circuit design within an IC package having a substrate. The IC package supports first terminals for carrying high-bandwidth signals and supports second terminals for carrying low-bandwidth signals. A respective capacitance is determined for each of a plurality of die contacts of the circuit design. A respective target inductance range is selected for each of the plurality of die contacts based on the determined capacitance of the die contact. An initial segmentation of the circuit design is assigned. The segmentation defines an initial first IC die and an initial second IC die that implement respective segments of the circuit design. Initial locations for the IC dies on the substrate are assigned. A respective impedance is calculated for each connection from one of the plurality of die contacts to a respective terminal of the IC package. In response to the calculated characteristic inductance falling outside the target inductance range, the IC dies are laterally displaced on the substrate as a function of the calculated characteristic inductance.

An IC package is also disclosed. The IC package includes a plurality of terminals and a substrate. The IC package also includes a plurality of IC dies placed on the substrate. The plurality of IC dies includes a plurality of die contacts. Each of the plurality of IC dies includes a respective sub-circuit of a communication circuit configured to communicate data signals at a target frequency via the die contacts. The IC package also includes a set of conductive traces, each connecting a respective one of the plurality of die contacts to a respective one of the terminals of the IC package. The IC dies are placed at locations on the substrate at which each conductive trace of the set, the respective die contact and the respective terminal connected thereto together exhibit a frequency response that does not attenuate frequencies at or below the target frequency.

In some implementations, the IC dies may be placed at locations on the substrate at which the conductive trace of the set satisfy skew and/or propagation delay parameters. For instance, a skew parameter may require that the lengths of the conductive traces not deviate by more than a certain amount. Skew and/or propagation delay parameters may apply to all of the conductive traces or may apply to certain conductive traces specified by a user (e.g., high-speed communication channels).

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
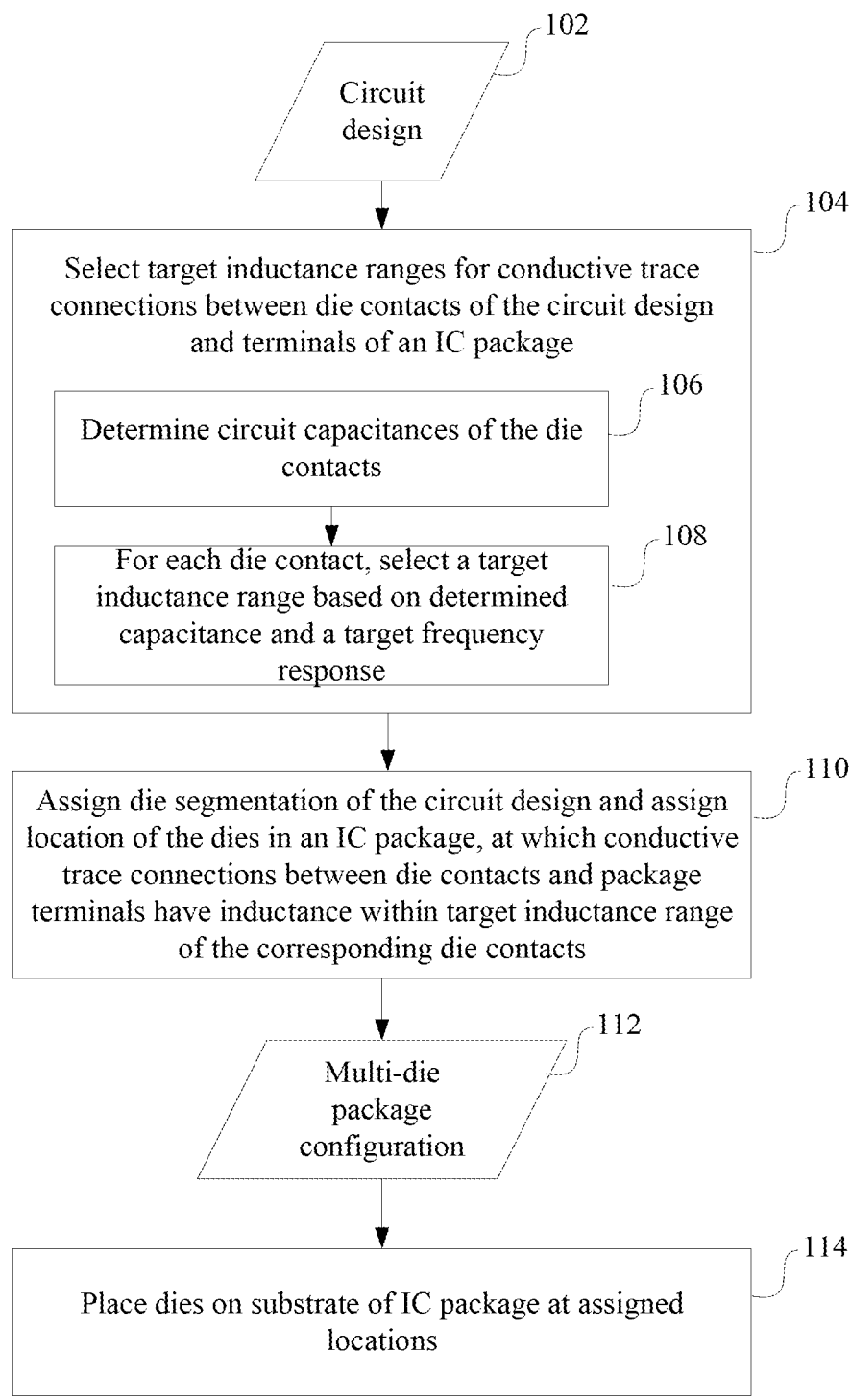
FIG. 1 shows a first process for configuring placement of a circuit design in an IC package, in accordance with one or more embodiments of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving ICs and packaging of ICs. As IC processes have advanced, feature sizes have become smaller and, in turn, this has allowed practical implementation of entire functions, on a single die. Further, the smaller feature sizes provided by advances in IC technology not only permit forming the entire circuit on a single die but have also reduced the dimensions and area of the die. Conventional design practice has therefore employed these advances in IC technology, in accordance with its conventional approach to providing increased density and bandwidth, and to implement the entire circuit on a single IC die.

Contrary to the conventional approach, various disclosed embodiments segment a circuit design into a plurality of segments, which are then implemented on respective dies. As explained in more detail with reference to the figures, various embodiments select locations in an IC package for the multiple dies in order to reduce the length of connections between die contacts and package terminals. In this manner, inductance exhibited by the connections may be reduced—thereby allowing a wider range of inductances to be achieved. Target inductances may be selected, for example, to achieve a desired frequency response, to reduce propagation delay, or reduce signal skew by reducing variation of inductances between different conductive.

Various example embodiments are directed to methods for implementing a circuit design within an IC package having a substrate and terminals for carrying signals communicated by the circuits of the circuit design. A respective capacitance is determined for each die contact of a plurality of die contacts of a circuit design. A respective target inductance range is selected for each of the plurality of die contacts based on the determined capacitance of the die contact. A segmentation of the circuit design is determined as a function of the target inductance ranges. The segmentation defines an implementation of the circuit design on a plurality of IC dies. The IC dies are placed at respective locations on the substrate, based on the resulting inductances of connections (e.g., conductive traces) between the die contacts and terminals of the IC package. More specifically, the IC dies are placed at locations at which the inductance of each connection is within the target inductance range of the corresponding die contact.

In some implementations, the target inductance range for each die contact is selected based on the determined capacitance and a respective frequency response parameter.

For instance, the circuit design may be configured to communicate high speed data signals (e.g., >1 Gpbs) via the die contacts. The target inductance range may be selected so the die contact, a respective terminal of the IC package and a connection there between together exhibit a frequency response that does not significantly attenuate at or below the frequency of the high speed data signal.

In some implementations, the target inductance ranges are selected based on the determined capacitances, to achieve certain impedances. For example, an IC package may be designed to have terminals with a specified impedance. For instance, impedance of an IC package, as measured by the terminals, may be selected to match impedance of PCB conductive traces—thereby reducing signal reflections. Impedance of a transmission line (formed by a terminal, a die contact and the connection there between) is given by $$Z_o = \sqrt{L/C},$$

where L is inductance exhibited by the transmission line and C is the capacitance per meter exhibited by the transmission line.

In some implementations, the circuit design is simulated to determine the capacitances of each of the die contacts. Likewise, in some implementations, the circuit design is simulated to determine the highest frequency of signals carried by each of the die contacts. Based on the determined highest frequencies, a desired frequency response may be determined that will not result in attenuation of the signals. Alternatively, a target frequency response parameter for each of the plurality of die contacts may be retrieved from a package model specification or input by a designer.

After the determination of the target inductance ranges, the segmentations of a circuit design and placement of the resulting IC dies on a package substrate, may be performed using various processes. In some implementations, an initial segmentation of the circuit design is assigned that defines two IC dies implementing respective segments of the circuit design. An initial first location on the substrate for the IC dies is assigned. A characteristic inductance is calculated for each connection from one of the plurality of the die contacts of the circuit design to a respective terminal of the IC package. In response to the calculated characteristic inductance falling outside the target inductance range, routing of the connections and/or placement of the IC dies is adjusted. In some implementations, the segmentation of the circuit design may be adjusted to include a larger number of dies, if a placement cannot be determined for which each connection has an inductance within the target inductance range.

Some various example embodiments are directed to an IC package. The IC package includes a plurality of terminals and a substrate. The IC package also includes a plurality of IC dies placed on the substrate. The plurality of IC dies include a plurality of die contacts. Each of the plurality of dies includes a respective sub-circuit of a communication circuit configured to communicate data signals at a target frequency via the die contacts. The IC package also includes a set of conductive traces, each connecting a respective one of the plurality of die contacts to a respective one of the terminals of the IC package. The IC dies are placed at locations on the substrate at which each conductive trace of the set, the respective die contact and the respective terminal connected thereto together exhibit a frequency response that does not attenuate frequencies at or below the target frequency.

Turning now to the figures, FIG. 1 shows a first process for configuring segmentation and placement of a circuit design in an IC package, in accordance with one or more embodiments of the present disclosure. At block 104, target inductance ranges are selected for conductive trace connections between die contacts of the circuit design 102 and terminals of an IC package. In this example, the target inductance ranges are selected based on capacitances of the die contacts. At block 106, a respective capacitance is determined for each die contact of the circuit design 102. At block 108, a respective target inductance range is selected for each of the plurality of die contacts based on the determined capacitance of the die contact and a target frequency response.

As indicated above, in some implementations, the target frequency response may be selected so that data signals communicated via the die contacts are not significantly attenuated in the frequency ranges of interest. In some implementations, the target inductance ranges may be selected based on the determined capacitances, to achieve target impedances. For example, the target impedances may be specified in an IC package specification or may be selected to match impedances of PCB traces that will connect to the terminals of the IC package.

At block 110, the segmentation of the circuit design into a plurality of IC dies is assigned. Also at block 110, a placement of the dies in an IC package is assigned as a function of the target inductance ranges. More specifically, the dies are placed so that connections (e.g., conductive traces) between the die contacts and terminals of the IC package have inductances within the target inductance ranges of the corresponding die contacts. The resulting segmentation and placement of dies may be saved in a multi-die package configuration 112. At block 114, dies implementing the defined segments of the circuit design are placed on a substrate of an IC package at the assigned locations.

Figure 2:
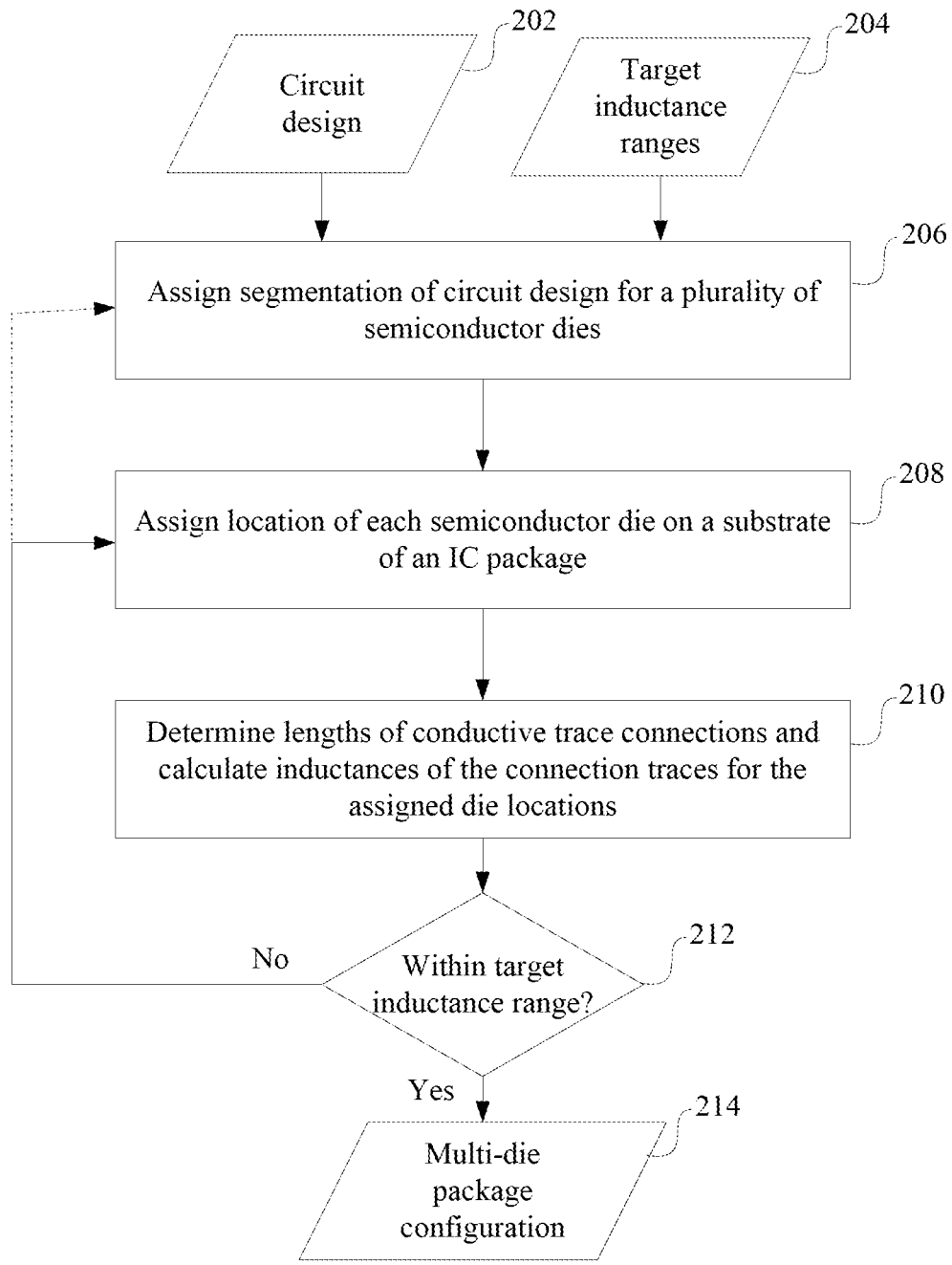
FIG. 2 shows a second process for configuring placement of a circuit design in an IC package, in accordance with one or more embodiments of the present disclosure.

After the determination of the target inductance ranges, the segmentations of a circuit design and placement of the resulting IC dies on a package substrate, may be performed using various processes. FIG. 2 shows a second process for segmenting a circuit design and placing dies of the resulting segments in an IC package to according to a set of target inductance ranges 204.

At block 206 a first segmentation of a circuit design 202 is assigned for implementation using a plurality of IC dies. In some implementations, the initial segmentation divides the circuit design into two segments for implementation on two respective IC dies. However, various implementations may initially segment the circuit design into a larger number of segments.

At block 208, initial locations are assigned for the IC dies on a substrate of an IC package. At block 210, lengths of conductive trace connections between die connections and terminals of the IC package are determined. In some implementations, the lengths may be determined based on a shortest path routing of the conductive trace connections. In some other implementations, the range of possible lengths may be determined for various possible routings of each conductive trace connection. Also at block 210, a characteristic inductance (or range of inductances) is calculated for each conductive trace connection with the dies at the assigned locations (e.g., based on the determined lengths).

In response to one or more of the calculated inductances falling outside the corresponding target inductance range, indicated in the set of target inductances 204, decision block 212 causes the process to assign different locations for the dies at block 208. In some implementations, routing of the conductive traces may be adjusted, in response to one or more of the calculated inductances falling outside the corresponding target inductance range, prior to assigning new die locations. In some implementations, a different segmentation of the circuit design (e.g., to include a larger number of dies) is assigned at block 206 if no placement is found where conductive trace connections have inductances within the target inductance range.

If the calculated inductances fall within target inductance ranges 204, the current segmentation of the circuit design 202 and die locations may be saved as a multi-die package configuration 214. During manufacture, the dies may be placed at the die locations on the substrate of a package according to the multi-die package configuration 214.

By segmenting a circuit into multiple dies, the lengths of conductive trace connections in a package may be reduced in comparison to a package having the circuit implemented on a single die. Due to the shorter possible lengths, connections may be configured to exhibit smaller impedance—thereby allowing wider range of inductances to be achieved.

Figure 3:
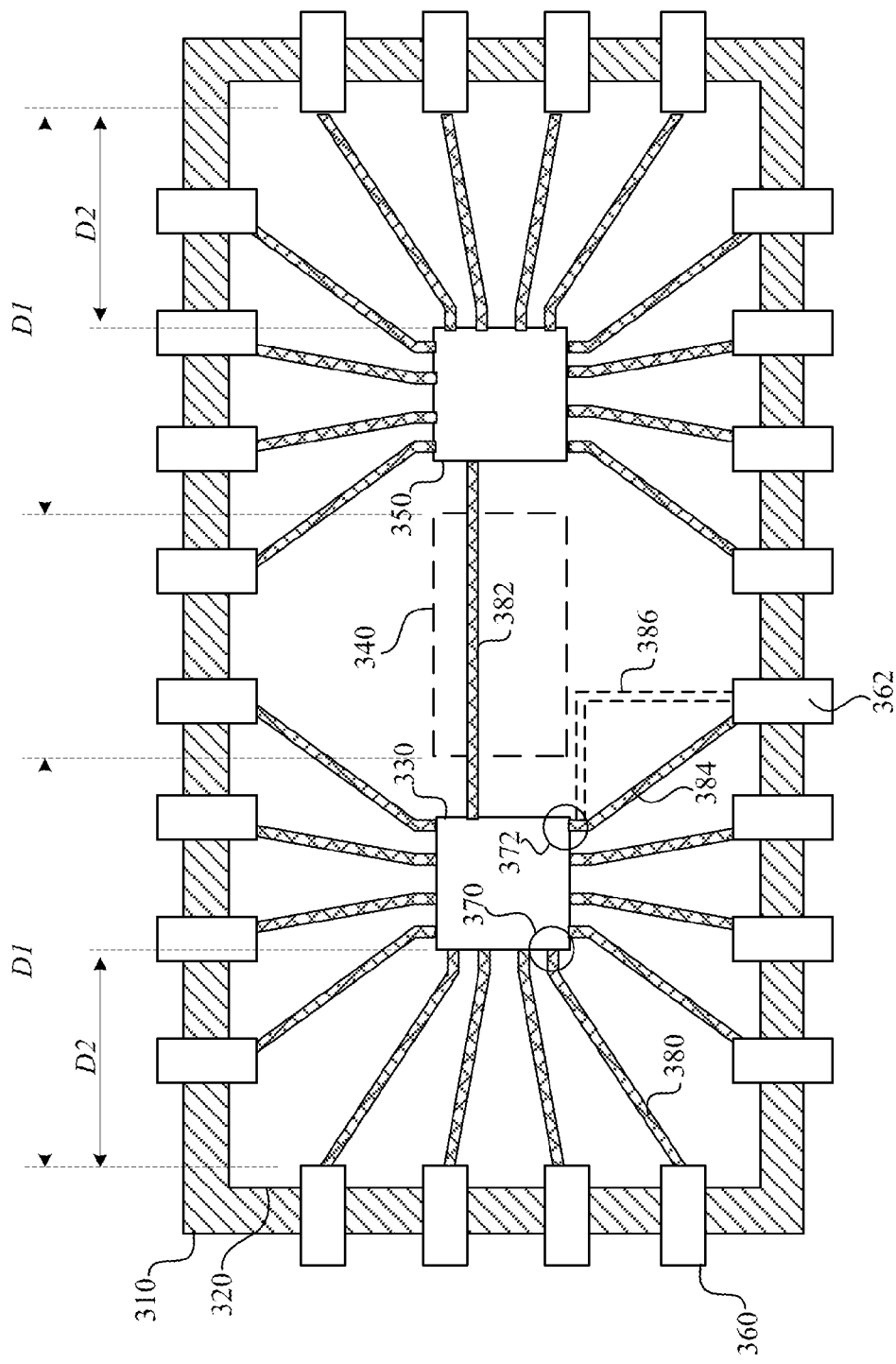
FIG. 3 shows an IC package having a plurality of IC dies placed on a substrate, in accordance with one or more embodiments of the present disclosure.

FIG. 3 shows an IC package having an IC die segmented and placed, in accordance with one or more embodiments of the present disclosure. The IC package 310 includes a substrate 320 and a plurality of terminals (e.g., 360 and 362) providing an external connection to circuits disposed on the substrate 320. A plurality of IC dies 330 and 350, which implement respective segments of a circuit, are placed on the substrate. The plurality of IC dies include a plurality of die contacts (e.g., at locations 370 and 372). The circuit segments on the dies are configured to communicate data signals at a target frequency or data rate via the die contacts. Various structures may be used for the die contacts in different implementations including, for example, solder-balls or surface contacts formed on various surfaces of the dies (e.g., topside, bottom side, and/or side surfaces). The IC package 310 also includes a set of conductive traces (e.g., 380, 384, and 386), which each connect a respective one of the plurality of die contacts to a respective one of the terminals of the IC package.

As an illustrated example, dashed box 340 shows an example placement location for a single (non-segmented) die having the circuits included in dies 330 and 350. The location 340 is centered to minimize the lengths of conductive traces (e.g., 380, 384, and 386) connecting the die contacts (e.g., at locations 370 and 372) to the terminals (e.g., 360 and 362). As shown in FIG. 3 conductive traces must have a length of at least D1 to connect terminals on the right and left sides to a single die at placement location 340. By using separate IC dies (e.g., 330 and 350) to implement respective segments of a circuit, placement of the dies may be selected to adjust the lengths of the conductive traces. In this example, the placement of the dies 330 and 350 reduce the length of the conductive traces, connected to the terminals on the right and left sides, to approximately the length D2. Connections between the segments implemented on the respective dies 330 and 350 may also be connected by conductive traces (e.g., 382).

As indicated above, the lengths of the conductive traces may be selected to achieve a target inductance. For instance, for a given capacitance of a die contact, the length of a conductive trace can be set so that a transmission line formed by the die contact, the conductive trace and the terminal connected thereto, exhibits a target frequency response. For example, the target frequency response may be selected so frequencies used for transmission of a data signal are not significantly attenuated.

The length of a conductive trace, and thereby inductance exhibited by the conductive trace, may be set via a number of mechanisms. As discussed above, segmentation of a circuit design and placement of IC dies may be used to achieve certain lengths of the conductive traces. Furthermore, for a given placement of the IC dies, conductive traces may be routed along various paths of different lengths. For instance, conductive trace 384 is routed along a shorted path between die contact location 372 and terminal 362. If a larger inductance is required, a conductive trace 386 following a longer path may be used.

Various blocks, modules or other circuits may be implemented to carry out one or more of the operations and activities described herein and/or shown in the figures. In these contexts, a "block" (also referred to sometimes as a "logic circuitry" or "module") is a circuit that carries out one or more of these or related operations/activities (e.g., determining target inductances, assigning a segmentation of a circuit design and/or assigning placement locations for IC dies). For example, in certain of the above-discussed embodiments, one or more modules are discrete logic circuits or programmable logic circuits configured and arranged for implementing these operations/activities, as shown in FIGS. 1, 2 and 3. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For instance, although implementations may in some cases be described in individual figures, it will be appreciated that features from one figure can be combined with features from another figure even though the combination is not explicitly shown or explicitly described as a combination. The disclosure may also be implemented using a variety of approaches such as those involving a number of different circuits, operating systems, and/or software programs/packages. Such modifications do not depart from the true spirit and scope of various aspects of the invention, including aspects set forth in the claims.

What is claimed is:

1. A method for implementing a circuit design within an integrated circuit (IC) package having substrate and terminals for carrying signals communicated by the circuits of the circuit design, the method comprising:
   determining a respective capacitance of each die contact of a plurality of die contacts of a circuit design;
   selecting a respective target inductance range for each of the plurality of die contacts based on the determined capacitance of the die contact;
   determining as a function of the target inductance ranges, a segmentation of the circuit design that defines at least a first IC die and a second IC die; and
   placing the first and second IC dies at respective locations on the substrate, at which the inductance of each connection, from the plurality of die contacts to terminals of the IC package, is within the target inductance range of the corresponding die contact;
   wherein determining the segmentation of the circuit design that defines at least a first IC die and a second IC die includes:
   assigning an initial segmentation of the circuit design defining the first IC die and the second IC die;
   assigning an initial first location for the first IC die on the substrate and an initial second location for the second IC die on the substrate;
   for each connection from one of the plurality of the die contacts of the circuit design to a respective terminal of the IC package, calculating a characteristic inductance for the connection; and
   wherein placing the first and second IC dies at respective locations on the substrate includes, in response to the calculated characteristic inductance falling outside the target inductance range, laterally displacing at least one of the first and second IC dies on the substrate as a function of the calculated characteristic inductance.

2. The method of claim 1, wherein the selecting of the target inductance range for each die contact includes, for each die contact of the plurality of die contacts, selecting the respective target inductance range based on the determined capacitance and a respective frequency response parameter.

3. The method of claim 2, wherein the determining of the respective capacitance of each die contact of the plurality of die contacts includes simulating the circuit design.

4. The method of claim 2, further comprising:
   simulating the circuit design to determine a respective highest frequency of signals carried by each of the plurality of die contacts; and
   for each of the plurality of die contacts, determining the respective frequency response parameter based on the respective highest frequency.

5. The method of claim 2, further comprising: retrieving the frequency response parameter for each of the plurality of die contacts from a package model specification.

6. The method of claim 1, wherein the connections between the plurality of die contacts and the terminals of the IC package are conductive traces on the substrate.

7. The method of claim 1, further comprising: routing each connection, from the plurality of die contacts to terminals of the IC package, to have a length causing the connection to have an inductance within the target inductance range of the corresponding die contact.

8. The method of claim 1, wherein the selecting of the target inductance range for each die contact includes, for each die contact of the plurality of die contacts, selecting the respective target inductance range based on the determined capacitance and a respective delay or skew parameter.

9. The method of claim 1, wherein selecting the respective target inductance range includes selecting the target inductance range.

10. The method of claim 1, wherein determining the segmentation of the circuit design includes providing a conductive trace having an increased length that provides a higher inductance and capacitance.

11. The method of claim 1,
   wherein said terminals are configured and arranged to carry high-bandwidth signals;
   further including a plurality of second terminals configured and arranged to carry low-bandwidth signals.

12. The method of claim 11, wherein selecting the target inductance range includes, for each of the die contacts, selecting a target inductance range based on the determined capacitance and a frequency response parameter.

13. The method of claim 12, further comprising:
   simulating the circuit design to determine a respective highest frequency of signals carried by each of the plurality of die contacts; and
   for each of the plurality of die contacts, determining the frequency response parameter for the die contact based on the determined highest frequency of signals carried by the die contact.

14. The method of claim 11, further including, in response to the calculated characteristic inductance falling outside the target inductance range, recalculating the characteristic inductance for each connection and repeating the step of laterally displacing until either of the following conditions is detected:
   (i) the characteristic inductances are within the target inductance ranges, or
   (ii) the target inductance ranges cannot be met using the initial segmentation.

15. The method of claim 14, further comprising, in response to determining that the target inductance ranges are not met using said segmentation, assigning a second segmentation of the circuit design that is different from said segmentation.

16. The method of claim 14, further comprising, in response to determining that the target inductance ranges are not met using said segmentation, assigning a second segmentation of the circuit design that is different than the initial segmentation, and repeating the steps of assigning the initial first location and calculating a characteristic inductance with the second segmentation of the circuit design.

17. The method of claim 11, wherein calculating the characteristic inductance for the connection includes calculating a characteristic inductance for a connection from one of the plurality of the die contacts to a respective terminal of the IC package, based on a shortest length connection between the one of the plurality of die contacts and the respective terminal.

18. The method of claim 11, further comprising routing each connection, from the plurality of die contacts to terminals of the IC package, to have a length causing the connection to have an inductance within the target inductance range of the corresponding die contact.

* * * * *